G. TODD.
Balancing Millstones.
No. 8,538. Patented Nov. 18, 1851.
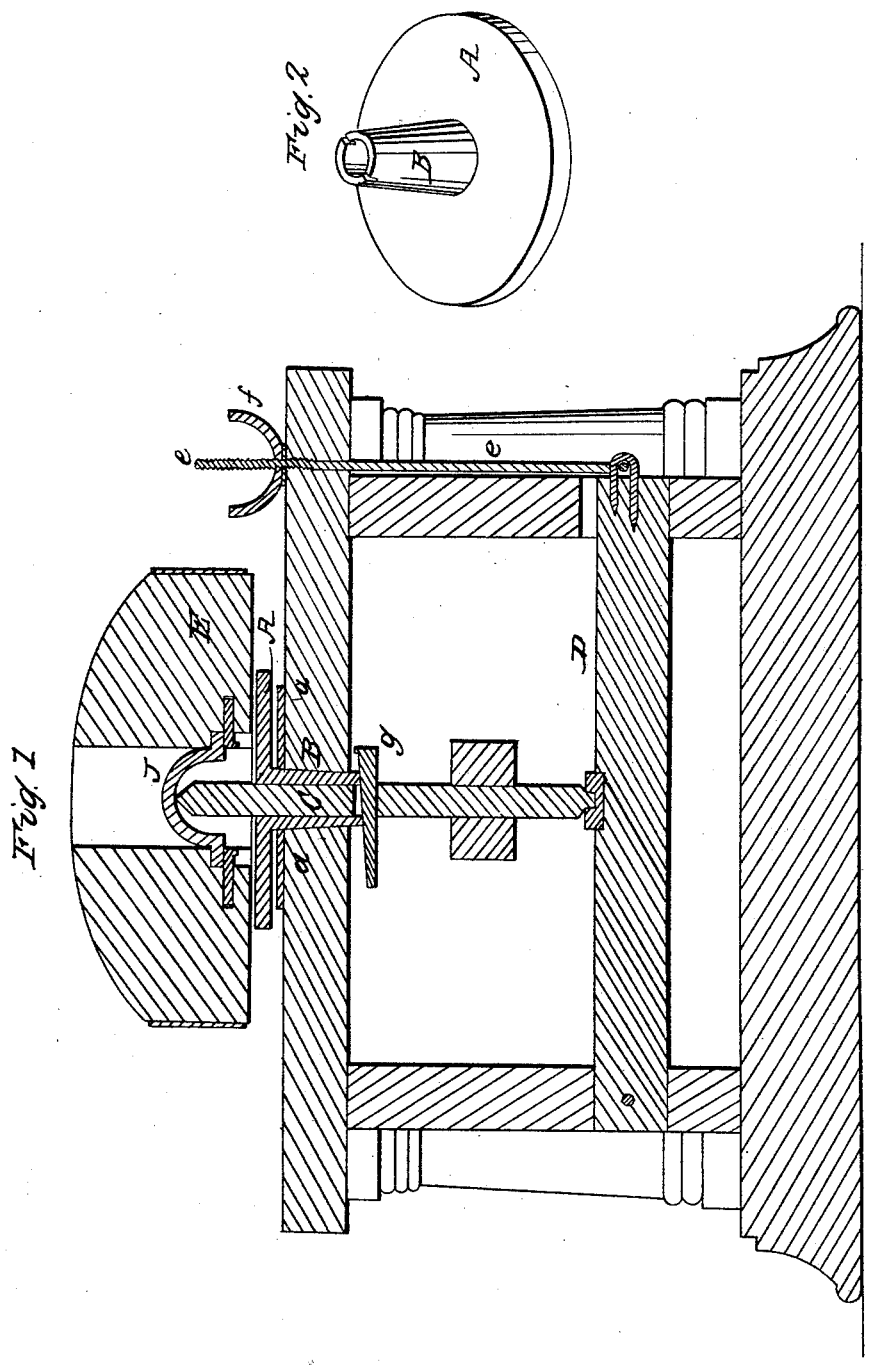

UNITED STATES PATENT OFFICE.

GEO. TODD, OF ST. LOUIS, MISSOURI.

FINISHING AND BALANCING MILLSTONES.

Specification of Letters Patent No. 8,538, dated November 18, 1851.

*To all whom it may concern:*

Be it known that I, GEORGE TODD, of the city and county of St. Louis, in the State of Missouri, have invented a new and Improved Manner of Finishing and Balancing Millstones; and I do hereby declare that the following is a full and exact description thereof, reference being had to the accompanying drawings, making a part of this specification, Figure 1 being a vertical section cut through the center of a millstone and of the apparatus employed in its construction, and Fig. 2 is a perspective view of a portion of the said apparatus detached.

Similar letters refer to corresponding parts in both figures.

In the construction of a mill stone, I make use of a husk frame constructed in any well-known or usual manner, with which husk frame I combine a surface chuck A, B, and a spindle C, in the manner represented in the drawings. The disk A, of the chuck, when at rest, is supported upon a metallic plate $a$, which is secured to the platform of the husk frame, the tubular portion B, of the said chuck, passing through a hole in the center of the said plate. The spindle C, is combined with the chuck in the following manner; viz,—A slot is formed in the spindle, and diametrical grooves are formed in the lower end of the tubular portion of the chuck; a key $g$, is inserted into the slot in the spindle, the edge of which key fits into the grooves in the tubular portion of the chuck, and thus couples the two together. The key $g$, is of such a width and shape that by driving it into the slot in the spindle, to a greater or less degree, the chuck can be raised or lowered upon the spindle. The spindle C, is supported in a bearing box secured to the beam D, which beam is jointed at one end to the husk frame, and its opposite end is suspended by a tension rod $e$, which is acted upon by the screw nut $f$, for the purpose of raising or lowering the spindle as circumstances may require.

I first construct the face and eye of the mill stone E, in the usual manner, and then before proceeding further, I fasten the balance rine J, into the eye of the stone. The said balance rine I employ in finishing and balancing the stone, and it also remains permanently in its position for future use in grinding. Having proceeded thus far, I next place the face of the commenced mill stone upon the face of the chuck, with the cock head of the spindle inserted into the countersink in the balance rine. I then proceed to fill up the remaining portion of the mill stone; and when it is ready for turning off into the desired shape, the spindle and chuck are elevated—by means of the regulating screw nut $f$—to such a degree as to raise the under surface of the disk of the chuck clear from the bed plate $a$, and allow the whole weight of the stone to rest upon the spindle. A rotary movement is then imparted to the spindle, when by means of a rest and suitable instruments, the mill stone is brought to its proper shape.

To ascertain whether the stone will perfectly poise itself on the cock-head of the spindle, the key $g$, is withdrawn from the slot in the spindle, which allows the chuck A, to descend, and brings the whole weight of the stone upon the cock-head.

This manner of finishing a mill-stone—it will be perceived—makes the center of the countersink in the balance rine, the exact center of the circumference of the mill stone; and therefore it is ready for use as soon as it is removed from the face of the chuck. And it is self evident, that millstones, thus balanced and finished, will run much steadier and truer in practice, than those constructed by any other process, where the balance rine is inserted after the mill stone has been otherwise completed. In which case, it will be almost impossible to make the countersink in the balance rine, the exact center of the stone; and consequently, weights and counterweights have to be employed to produce an imperfect balance of the stone upon the cock head of the spindle.

What I claim as my invention and desire to secure by Letters Patent, is—

The inserting the balance rine in the eye of a mill stone in the early stage of its construction, and then making use of the said balance rine, in conjunction with a chuck combined with the spindle, in completing the stone substantially as herein set forth.

The above specification of my improved manner of balancing and finishing mill stones signed this eighth day of October 1851.

GEORGE TODD.

Witnesses:
JOHN H. MORRIS,
WILLIAM H. MORRIS.